US 8,637,831 B2

(12) United States Patent
Hayden et al.

(10) Patent No.: US 8,637,831 B2
(45) Date of Patent: Jan. 28, 2014

(54) HYBRID ORGANIC PHOTODIODE

(75) Inventors: Oliver Hayden, Herzogenaurach (DE);
Tobias Rauch, Fuerstenfeldbruck (DE);
Reiner Franz Schulz, Dormitz (DE);
Maria Sramek, Erlangen (DE); Sandro Francesco Tedde, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 17 days.

(21) Appl. No.: 13/294,385

(22) Filed: Nov. 11, 2011

(65) Prior Publication Data

US 2012/0121067 A1    May 17, 2012

(30) Foreign Application Priority Data

Nov. 11, 2010  (DE) .................. 10 2010 043 749

(51) Int. Cl.
*G01T 1/20* (2006.01)
(52) U.S. Cl.
USPC .................................... 250/370.11
(58) Field of Classification Search
USPC ..................................... 250/361 R
See application file for complete search history.

(56) References Cited

U.S. PATENT DOCUMENTS

| | | | |
|---|---|---|---|
| 6,150,668 A * | 11/2000 | Bao et al. ..................... 257/40 |
| 2004/0227097 A1* | 11/2004 | Brabec et al. ............ 250/370.12 |
| 2007/0272872 A1 | 11/2007 | Joshkin et al. |
| 2010/0074396 A1 | 3/2010 | Schmand et al. |
| 2010/0163737 A1* | 7/2010 | Masuda et al. ................ 250/366 |
| 2011/0095266 A1 | 4/2011 | Hayden et al. |

FOREIGN PATENT DOCUMENTS

WO    2008/022820    2/2008

* cited by examiner

*Primary Examiner* — Marcus Taningco
(74) *Attorney, Agent, or Firm* — Schiff Hardin LLP (57) ABSTRACT

An x-ray detector that is suitable for both imaging and dose rate measurement has a hybrid photoactive layer arranged between an electrode and a substrate. The hybrid photoactive layer includes a number of scintillators as well as a bulk heterojunction and is designed to produce indirect x-ray conversion. The bulk heterojunction absorbs the scintillator radiation to form electron-hole pairs that are detected electrically. The production takes place by a spraying process, in particular a co-spraying process of bulk heterojunction solution and scintillator particle suspension.

12 Claims, 6 Drawing Sheets

HYBRID ORGANIC PHOTODIODE

BACKGROUND OF THE INVENTION

1. Field of the Invention

The present invention concerns x-ray detectors based on indirect x-ray conversion.

2. Description of the Prior Art

Figure 1:
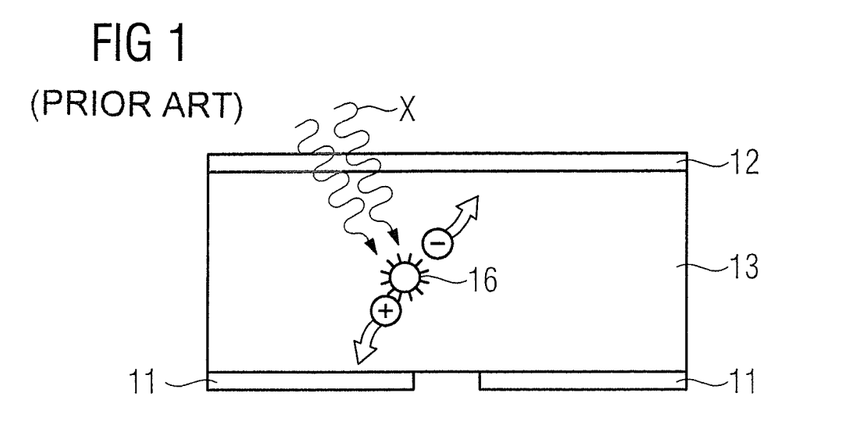
FIG. 1 shows an x-ray detector based on direct x-ray conversion.
Figure 2:
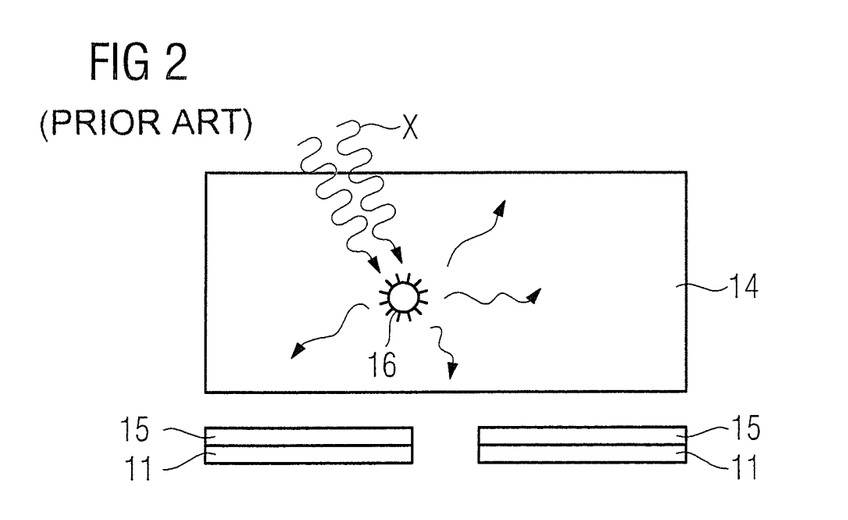
FIG. 2 shows an x-ray detector based on indirect x-ray conversion.

In the field of x-ray detectors, there is a fundamental differentiation as to whether the x-ray detector is based on direct or indirect x-ray conversion. These forms of x-ray detection are shown in FIGS. 1 and 2, respectively and described below in detail.

In direct x-ray conversion, the x-ray radiation is absorbed in a material and an electron-hole pair is generated with the energy of said x-ray radiation. The generated electron-hole pair can be read out electronically. Amorphous selenium is used as a material for this purpose, for example. Silicon diodes are also used for direct x-ray conversion. Direct x-ray conversion in a semiconductor depends on a certain layer thickness in order to absorb a sufficiently high proportion of the radiation for a detection. Silicon diodes for direct x-ray conversion have component thicknesses of approximately 1 cm. Layers of up to 1 mm in thickness are used for direct x-ray conversion in amorphous selenium. Selenium as an absorber is particularly disadvantageous due to its high toxicity.

For indirect x-ray conversion, it is known to use combinations of a scintillator layer and a photodetector. The spectral sensitivity of the photodetector is thereby in the wavelength range of the fluorescence emission of the scintillator layer that is generated by x-ray conversion. The scintillator layers are materials such as, for example, cesium iodide or gadolinium sulfur oxide. Since scintillators made from cesium iodide are extremely hygroscopic, their use in combination with photodetectors is always linked with a structural cost (for example for a moisture protection encapsulation) and is disadvantageous to the service life of the x-ray detector.

In addition to the two basic x-ray conversion forms that are possible, in the field of x-ray detection differentiation must also be made according to the field of use. In the field of use of x-ray imaging—for example the medical field—cost-effective and large-scale solutions are sought. This depends on a high spatial resolution for the imaging. Direct x-ray converters have previously been used for medical imaging, but those have significant component depths and therefore require high, energetically inefficient operating voltages in the kV range. Alternatively, a scintillator layer on a photodetector array is used which must disadvantageously be constructed from a number of pixelated photodetectors in order to ensure the desired spatial resolution.

In addition, x-ray detectors are used in x-ray dose rate measurement. In x-ray apparatuses in the medical field and in industry and safety technology, the x-ray dose is measured with components known as dosimeters. An efficient transduction of the absorbed x-ray radiation into a usable signal is important for the x-ray dose measurement. The signals should be sufficiently high and noise-free in order to determine a precise x-ray dose. A local absorption of the x-ray radiation is important for the use of the x-ray dose monitoring devices in combination with an x-ray imaging. This means that a clear signal must be generated from only a small amount of absorbed x-ray radiation. This is necessary in order to not generate any shadows on the x-ray image. Low absorption is necessary, however, in the dose measurement in order to keep the x-ray exposure (for a patient, for example) as low as possible for a clear x-ray image. Ionization chambers or thick silicon photodiodes have previously been used for monitoring of the x-ray dose rate, for example.

A disadvantage of known x-ray detectors is that they are suitable only for severely limited range of use. The different modes of operation for x-ray detection cannot be advantageously combined with one another. Moreover, all known x-ray detectors exhibit significant component depths.

SUMMARY OF THE INVENTION

An object of the present invention is to provide an x-ray detector that can be used both for x-ray imaging and for x-ray dose measurement. Moreover, it is an object of the present invention to provide an arrangement of such an x-ray detector with an x-ray apparatus, as well as to provide a method for the manufacture of such a x-ray detector.

The x-ray detector according to the invention is designed for imaging and/or for dose rate measurement. The x-ray detector has a hybrid photoactive layer between a first electrode and a substrate. The first electrode is a cathode of the photodiode. The hybrid photoactive layer includes a number of scintillators as well as a bulk heterojunction. The photoactive layer is designated as a hybrid since, with the scintillators and the bulk heterojunction, it comprises two different converter materials. However these are not arranged in separate layers as has previously been known; rather they are combined into a single, photoactive layer. The scintillators serve to convert the x-ray radiation into scintillator radiation, in particular fluorescence radiation in the visible wavelength range. The bulk heterojunction is designed to absorb in precisely this wavelength range of the scintillator radiation and to thereby form electron-hole pairs. The hybrid photoactive layer (which has scintillators and a bulk heterojunction) is therefore designed to produce indirect x-ray conversion. Moreover, the x-ray detector is designed to electrically detect the electron-hole pairs that are generated in the bulk heterojunction. The x-ray detector according to the invention has the advantage of operating satisfactorily with a low component depth, with an individual hybrid photoactive layer between a first electrode and a substrate, and has a very simple structure. The x-ray detector according to the invention, moreover, accomplishes these features without highly toxic selenium. The hybrid photoactive layer is equally suitable to ensure an imaging or a dose rate measurement.

In organic electronics, heterojunctions that extend over the entire layer volume (bulk) are designated as bulk heterojunctions. At least two materials that differ in their property as a hole or electron conductor (hetero) are combined into a layer that forms interfaces of the two materials in the entire layer volume. In a bulk heterojunction the separation of the charge carriers—i.e. the electron-hole pairs—takes place precisely at these interfaces.

In an embodiment of the invention, a bulk heterojunction has organic semiconductor materials that are soluble and can be deposited by a spraying process. These properties are advantageous for the absorption property as well as the suitability for separation of the electron-hole pairs in the bulk heterojunction, because efficient bulk heterojunctions can only be produced given suitability for a defined deposition technique.

In an additional embodiment of the invention, the scintillators occupy a volume proportion between 10% by volume and 70% by volume of the hybrid photoactive layer, in particular between 10% by volume and 50% by volume. Such a volume proportion of scintillators in the hybrid photoactive layer has a positive effect on the energetic conversion of the x-ray radiation into electrical signals. In particular, an adaptation for use for dose measurement or for imaging can be made in this interval. A lower absorption of the x-ray radiation is advantageous for the dose measurement; a higher absorption of the x-ray radiation is advantageous for imaging.

In a further embodiment of the invention, the hybrid photoactive layer has a homogenous layer thickness and this layer thickness is between 0.5 μm and 500 μm, in particular between 0.5 μm and 100 μm. The total layer thickness of the hybrid photoactive layer is 500 μm. The total layer thickness of the hybrid photoactive layer can also amount to 100 μm or just 10 μm. Total layer thicknesses of 1 μm can also be realized. The thin layer thickness correspondingly has an advantageous effect on the total component thickness. In particular, via a variation of the layer thickness the hybrid photoactive layer of the x-ray detector can be designed with a thinner hybrid photoactive layer for use for dose rate measurement or with a thicker hybrid photoactive layer for use for x-ray imaging.

In a further embodiment of the invention, the x-ray detector has an ALD layer. In particular, the ALD layer is a second electrode of the x-ray detector. The second electrode is in particular the anode of the photodiode.

A layer that was produced by an ALD process is designated as an ALD layer. ALD stands for Atomic Layer Deposition, a known deposition method. Layers with characteristic properties can be generated by means of ALD. An ALD layer is in particular homogenous at an atomic level in terms of its thickness. In particular, an ALD layer is isotropic with regard to its electrical, optical or mechanical properties.

The use of an ALD layer as a second electrode is particularly advantageous since the ALD layer can equally serve as a moisture protection layer, and thus replaces an encapsulation for moisture protection, or this can be supported by the ALD layer.

The ALD layer is arranged between the scintillators and the bulk heterojunction. For example, for this scintillator needles or scintillator particles have been coated in an ALD process before the bulk heterojunction was deposited on them. In this structure the ALD layer serves particularly effectively as a moisture barrier around the scintillators.

The introduction of an ALD layer as one of the electrodes—in particular as an anode—thus has the additional advantage that the scintillators surrounded by said ALD layer experience a moisture protection. The dense ALD layer reduces the moisture absorption of the hybrid photoactive layer and acts like an encapsulation. An encapsulation can additionally be produced around the entire module with hybrid photoactive layer, substrate and electrodes. The hybrid embodiment of the x-ray detector therefore offers the advantage that a separate encapsulation of organic photoactive layer and scintillator layer is not necessary. Reactive top electrodes (that include calcium, for example) can be replaced by ALD-deposited aluminum top electrodes. X-ray detectors that are stable over a very long period of time can thus be achieved.

In a further embodiment of the invention, the ALD layer is at least partially permeable to electromagnetic radiation in the wavelength range of the x-ray radiation that is to be detected, or to light in the wavelength range of the scintillation radiation of the scintillators.

In a further embodiment of the invention, the index of refraction of the ALD layer is higher than the index of refraction of the scintillator material specifically in the wavelength range in which the fluorescence radiation that can be excited in the scintillator lies. This has the advantage that the x-ray radiation striking the scintillator excites a fluorescence radiation in said scintillator, which fluorescence radiation is then totally reflected in the scintillator at the ALD layer as in an optical waveguide, and thus exits at a predeterminable exit point of the optical waveguide in a targeted manner. Such an exit point is a gap in the ALD layer that is advantageously arranged at the point of the needle in needle-shaped (spicular) scintillators.

In the arrangement with an x-ray apparatus according to the invention, the x-ray apparatus has a sensor that is a three-field or five-field sensor to monitor the applied x-ray dose. This three-field or five-field sensor in turn has x-ray detectors according to the invention. In particular, the detector for dose monitoring is arranged in the beam path of the x-ray radiation between the x-ray tube (i.e. the x-ray radiation source) and the imaging unit. Such an arrangement with an x-ray apparatus which uses an x-ray detector according to the invention to monitor the applied x-ray dose has the advantage that the x-ray detector exhibits a low component depth and low absorption, and the sensor accordingly does not have a disadvantageous effect on the x-ray imaging. Moreover, the x-ray detector according to the invention ensures an efficient transduction of the absorbed x-ray energy into a detectable electrical signal.

In another embodiment of the invention, the arrangement with the x-ray apparatus comprises a sensor that has a number of x-ray detectors that are mounted in a two-dimensional matrix arrangement. Due to their low layer thickness and correspondingly low absorption, the x-ray detectors according to the invention have the advantage that they can also be applied over a large area for the purpose of dose monitoring. A very exact dose measurement is accordingly possible. A corresponding x-ray detector likewise has an advantageous effect for the imaging field of application. With the hybrid photoactive layer, x-ray sensors of large area can be manufactured and, for example, structured in a matrix in order to ensure a spatial resolution.

In particular, the arrangement with the x-ray apparatus has a sensor that has a standard size of 43×43 $cm^2$ for Automatic Exposure Control units. This has the advantage that the new sensor according to the invention can be used in all conventional x-ray apparatuses.

In the method to produce an x-ray detector according to the invention, a number of scintillators as well as a bulk heterojunction are deposited on a substrate, wherein the bulk heterojunction is precipitated from solution by a spraying process. This has the advantage that different organic semiconductor materials that can only be dissolved in different solvents can be deposited simultaneously, whereby a bulk heterojunction can be generated first. A spraying process is furthermore advantageous for a large-area deposition of the bulk heterojunction.

In an embodiment of the invention, in the method the scintillators are precipitated from a suspension via a spraying process. The scintillators are thereby deposited simultaneously with the bulk heterojunction in a co-spraying process. In the co-spraying process, the suspension with the scintillators as well as the solution of the bulk heterojunction materials are deposited on a common substrate and a hybrid photoactive layer according to the invention is thus formed. This has the advantage that an x-ray detector according to the invention can be produced in a single deposition step.

In an alternative embodiment of the invention, in the method the bulk heterojunction is applied from solution via a spraying process onto the scintillators that have already been deposited on the substrate. This has the advantage that, for example, scintillators that cannot be deposited by a spraying process can also be introduced into a bulk heterojunction in a manner according to the invention so that a hybrid photoactive layer is created.

In an embodiment of the invention, the method comprises an additional process step to deposit an ALD layer. This means that, after the deposition of the scintillators on the substrate, these are coated via an ALD process, wherein in particular an electrode is deposited via said ALD process. The bulk heterojunction is subsequently deposited on the scintillators coated by said ALD layer. This has the advantage that the scintillators receive an additional moisture protection layer due to the ALD layer. The ALD process is advantageous for this since it ensures an isotropic deposition even given difficult aspect ratios of the scintillators to be coated.

The x-ray detectors according to the invention for indirect x-ray conversion accordingly have an organic photodiode based on a bulk heterojunction in which a scintillator materials are embedded. The organic semiconductor materials that are used for the bulk heterojunction are characterized in that they have very low dark currents. In contrast to polymer photoconductors whose conductivity can be increased under incident light radiation, the dark currents and the currents upon exposure of the photoactive materials that are used differ by multiple orders of magnitude. This is necessary or at least advantageous for the use for x-ray imaging in order to ensure a marked contrast between coated and dark regions. Polymer photoconductors would not be suitable for an x-ray imaging since here gradients would arise between exposed and dark regions. Furthermore, the organic semiconductor materials that are used are particularly strongly absorbent in the wavelength range of the fluorescence radiation, whereby an effective transduction of the light energy into electrical charge is ensured.

Cesium iodide or gadolinium sulfur oxide are suitable as scintillators, for example. Cesium iodide is a representative of scintillators that grow in the shape of needles, which are grown on a substrate. Gadolinium sulfur oxide can exist in the form of particles. X-ray detectors for x-ray imaging can advantageously be achieved with scintillator needles. The scintillator particles have the advantage that their isotropic fluorescence emission can be absorbed in the bulk of the organic semiconductor layer. The particles can alternatively be deposited by a spraying process or by a co-spraying process with the bulk solution, or can even be applied on the substrate chronologically before the deposition of the bulk heterojunction, but in every case the scintillator needles are initially grown on the substrate before the bulk heterojunction is deposited.

The module of the x-ray detector—in particular the hybrid photoactive layer made up of scintillators and bulk heterojunction—differs from previous x-ray detectors in every case in that no stacking (i.e. layering on top of one another) of scintillator layer and photodetection layer exists; rather, both converters are included in a single layer. In particular, the scintillators—whether needles or particles—are directly embedded in the bulk heterojunction so that the scintillators are directly surrounded by said bulk heterojunction.

If the scintillators are not in direct contact with the bulk heterojunction, they are separated it from the bulk heterojunction by a thin ALD layer. This layer, only a few atoms thick, can represent one of the electrodes of the x-ray detector. In particular, the layer is also a moisture protection for the scintillators and/or the organics of the bulk heterojunction.

Given preference for an isotropic fluorescence emission from the scintillators, for example for use in dose rate measurement, the ALD layer is advantageously transparent in the wavelength range of the fluorescence radiation of the scintillators that is excited by the incident x-ray radiation.

For use as x-ray imagers, scintillator needles are advantageously used as waveguides and are surrounded with an ALD layer whose index of refraction is chosen so that the fluorescence radiation arising in the scintillators is totally reflected at the surface of the scintillators and is conducted in the scintillators as in a waveguide. The fluorescence radiation thus can be conducted to a defined exit point from the scintillator, in particular to the needle tips of the scintillators. These are therefore not coated by an ALD layer. Given such a structure of the hybrid photoactive layer, the entire bulk heterojunction is not encompassed by fluorescence radiation; rather, it is predominantly the photoactive region between the scintillator tips and the cathode that is encompassed. A minimum distance between the scintillators and the cathode of between 50 and 200 nm is advantageously chosen for this. Such hybrid photoactive layers ensure an efficient transduction of x-ray radiation into electrical signal charges at a very high spatial resolution.

In addition to the hybrid photoactive layer, the x-ray detector thus comprises at least one first electrode and a substrate. The substrate can be a transparent substrate (for example a glass substrate) or can also be an active matrix backplane. A second electrode (for example the anode of the photodetector) can be applied on the substrate. The anode can in turn be transparent (for example can be a TCO, a transparent conductive oxide) that, for example, can be deposited via an ALD process. The anode can be composed of multiple anode pixels or can be continuous. One of the electrodes is appropriately the anode or the cathode made up of multiple pixels. For example, for the case of the embedded scintillator particles the hybrid photoactive layer can be arranged between the anode and the cathode. Interlayers that, for example, serve for charge separation can also be arranged between anode and cathode. However the anode can also be arranged between the scintillators and the bulk heterojunction if the bulk heterojunction was applied in the form of an ALD layer over the scintillator needles, for example. Accordingly, it is then not the anode that is pixelated but rather the cathode. In general, an inverse structure is also possible wherein the cathode is initially applied on the substrate and the anode is applied on the hybrid photoactive layer, but the design with a top cathode (that, for example, can be made of a metal) is advantageous. Aluminum, calcium-silver or calcium-gold electrodes are suitable metals for this top cathode. For example, such metal electrodes can be deposited via vaporization processes. In the case of thermal vaporization processes, a structuring of the top electrode can be produced by shadow masks.

Alternatively, the top electrode can be applied isotropically by an ALD process, which is possible with aluminum, for example. A lithography process can also be used for a structuring of the anode on the substrate.

The substrate for the hybrid photoactive layer can in particular also be of flexible design.

In the case of a design in which the scintillators are deposited chronologically before the bulk heterojunction, the bulk heterojunction can also be produced from solution by an immersion process (which is another alternative to a spraying process).

DESCRIPTION OF THE PREFERRED EMBODIMENTS

FIG. 1 shows an x-ray detector for direct x-ray conversion according to the known prior art. A material 13 that is suitable for absorption and direct conversion of x-ray radiation X is arranged between a pixel electrode 11 and a top electrode 12. The pixelation of the electrode 11 is produced for spatial resolution. The top electrode 12 is permeable to x-ray radiation X. The x-ray radiation X is absorbed in the material 13 to form an electron-hole pairs. In FIG. 1, the conversion center 16 is schematically shown in which the transduction of the radiation energy of the x-ray radiation X into electrical energy takes place in that the energy of the radiation is transferred to an electron and this is raised to a higher energetic state. The electron-hole pair that is formed in such a manner can be separated in an applied field that can be applied to the material layer 13 via the electrodes 11, 12. This means that the x-ray detector operates under a bias voltage and can detect a current flow 1 upon absorption of x-ray radiation X.

FIG. 2 shows an x-ray detector for indirect x-ray conversion according to the prior art. This x-ray detector is designed in two parts for indirect x-ray conversion. On the one hand, the x-ray detector comprises a scintillation layer 14 in which the conversion of x-ray radiation X into fluorescence radiation takes place. In this case a conversion center 16 is also schematically shown in which the transduction of the energy of the x-ray radiation into light energy happens. A second part of the x-ray detector comprises photodetectors 15, in particular photodiodes 15, and again comprises pixelated electrodes 11. These photodiodes 15 are suitable to detect the fluorescence radiation of the scintillator layer 14.

Known scintillator materials that can be used for a scintillator layer are, for example, gadolinium sulfur oxide or cesium iodide. The layer thickness of such a scintillation layer typically amounts to 0.1 mm to 1 mm. The layer for direct x-ray conversion 13 can be a silicon photodiode with a high layer thickness of more than 1 cm, or amorphous selenium can be used as a direct x-ray converter. The selenium layers for direct x-ray conversion typically amount to up to 1 mm in the layer thickness. The direct x-ray converters are biased with voltages in the range of a few kV in the reverse direction, for example.

Figure 3:
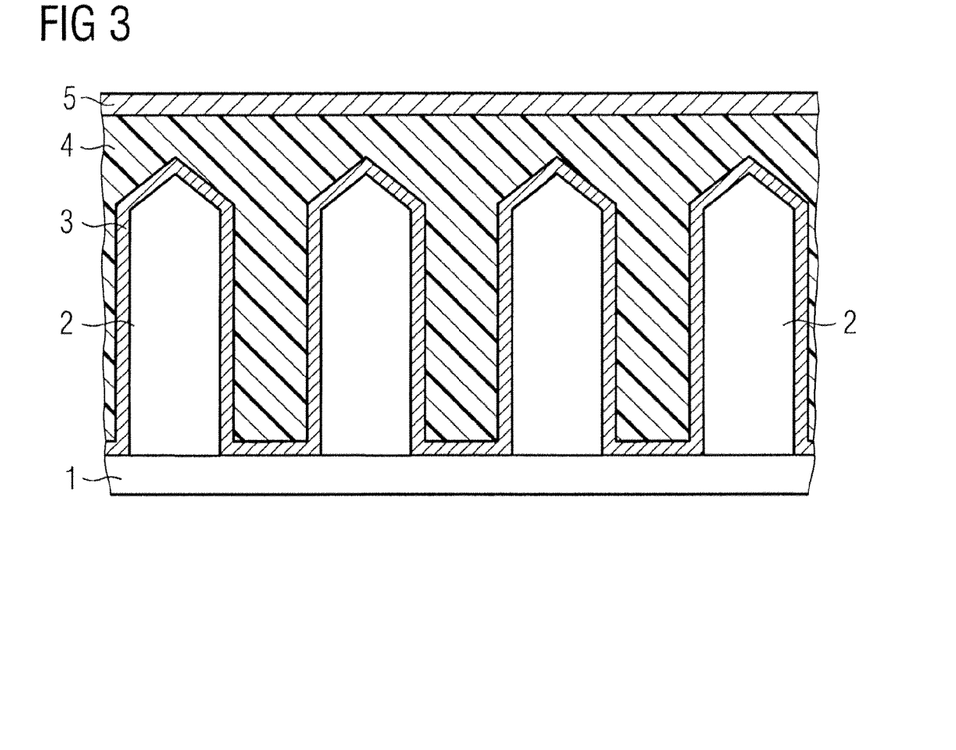
FIG. 3 shows an x-ray detector with hybrid photoactive layer.
Figure 4:
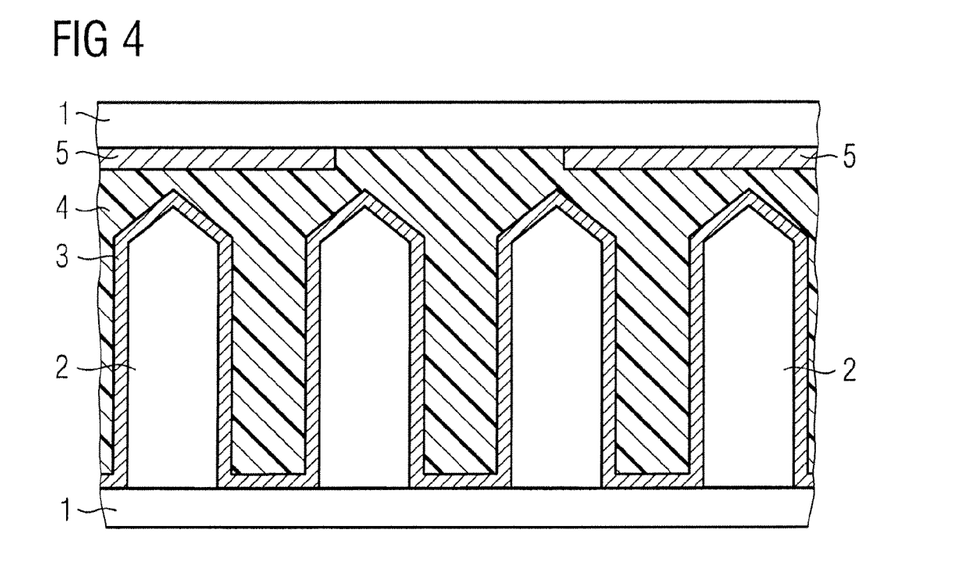
FIG. 4 shows an x-ray detector with pixelated cathode.
Figure 5:
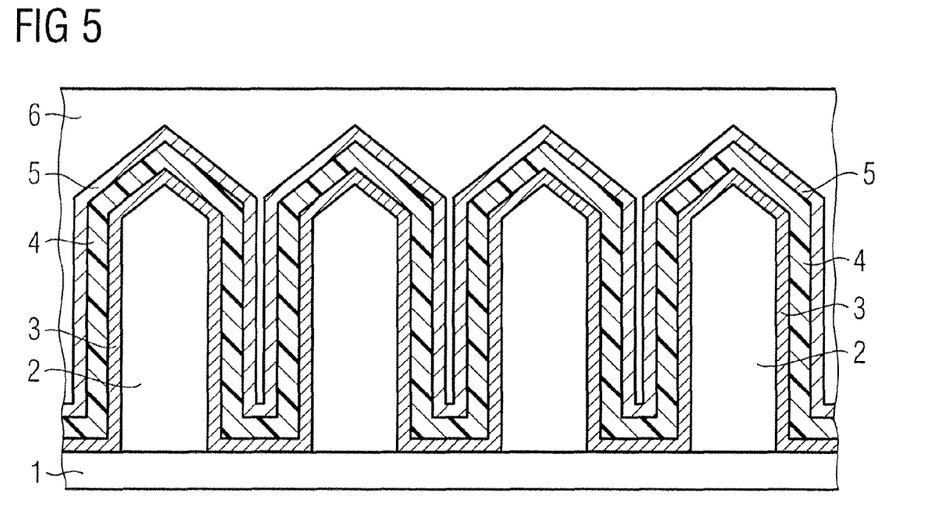
FIG. 5 shows an alternative embodiment of the x-ray detector.

FIGS. 3, 4 and 5 each show an x-ray detector with hybrid photoactive layer, wherein the scintillators 2 are scintillator needles that are grown on a substrate 1. The scintillator needles 2 are cesium iodide scintillators, for example. The substrate 1 can be a glass substrate. An ALD layer 3 is deposited over the scintillator needles 2 grown on the glass substrate 1. In particular, the ALD layer 3 is a transparent conductive oxide (TCO). This ALD layer 3 can thus fulfill the function of the anode of the hybrid photodiode. After the ALD layer 3, the interstices of the scintillator needles 2 on the substrate 1 are filled with a bulk heterojunction 4 and the needles 2 are covered with this so that a thick hybrid photoactive layer is created in which the scintillator needles 2 are completely embedded. The hybrid photoactive layer is covered by a cathode 5. This can in turn be applied via an ALD process. For example, aluminum is used for this purpose. Alternatively, the cathode 5 can be produced by thermal vaporization of a metal or multiple metals. In FIG. 3 the cathode 5 is applied over a large area on the photoactive layer. The application of the anode 3 by an ALD process on two the scintillator needles 2 has the advantage that an isotropic deposition takes place even given a high aspect ratio of the scintillator needles 2.

A substrate 1 with grown scintillator needles 2 that are covered by an ALD layer 3 is likewise shown in FIG. 4. Here as well the deposition of a bulk heterojunction 4 takes place in the needle interstices and over the scintillator needles 2, such that these are completely embedded in the bulk heterojunction 4 and, with said bulk heterojunction 4, form a hybrid photoactive layer. The top electrode 5, which represents the cathode of the hybrid photodiode, is shown pixelated in this case, meaning that the cathode 5 is discontinuous and a spatial resolution can thus take place. An additional substrate 1 is shown over the cathode 5. This additional substrate 1 can be part of an encapsulation of the x-ray detector. In particular, the hybrid photoactive layer can be completely encapsulated in order to protect it against the penetration of moisture that could have a disadvantageous effect on the organic materials and on hygroscopic scintillator materials as well.

FIG. 5 shows an alternative embodiment of the x-ray detector in which the scintillator needles 2 are again grown on a substrate 1 and both electrodes 3, 5 have been isotropically deposited by an ALD process. The anode 3 is directly deposited on the scintillator needles 2. The cathode 5 is deposited on a bulk heterojunction four. The bulk heterojunction 4 in this case is deposited only as a relatively thin layer over the needles 2. In particular, the bulk heterojunction 4 amounts to a layer thickness of less than 100 nm. The electrode layers 3, 5 as well as a bulk heterojunction 4 accordingly still depict the needle structure. The needle interstices are then filled with a filling material 6 and the scintillator tips are therefore covered. An epoxide can be used as a filling material 6, for example. This primarily serves for the stabilization and the moisture protection of the hybrid photodetector.

In the shown x-ray detectors with scintillator needles 2, the anode 3 is always arranged between the scintillators 2 and the bulk heterojunction 4. So that the scintillation radiation that is excited in the scintillators 2 by the penetrating x-ray radiation X can be absorbed by said bulk heterojunction 4, the scintillation radiation must be able to exit through the anode 3 into the bulk heterojunction 4. For example, a transparent conductive oxide (TCO) is used as an anode 3 for this. This can also be deposited by an ALD process. Most of all, transparency must be ensured in the wavelength range in which the scintillators 2 emit radiation. In this case an isotropic emission can take place in the photoactive organic semiconductor material 4, and the x-ray detector also can be used for dose rate measurement.

In order to generate an x-ray image—i.e. for the purposes of x-ray imaging—a spatial resolution of the incident x-ray radiation must take place. Pixelated electrodes 3, 5 are used for this, in this case preferably a pixelated cathode 5 as shown in FIG. 4. Particularly advantageous for this is an ALD-deposited anode 3 that has an index of refraction that has the effect that the scintillation radiation is totally reflected at the surface of the scintillators 2 and is conducted into the scintillator needles 2 as in an optical waveguide. If a discontinuity of the ALD layer is then provided—advantageously at the needle tips—the fluorescence radiation exits in a directional manner at this point and a high spatial resolution of the x-ray detector is ensured.

A benefit to x-ray imaging or to dose rate measurement can accordingly take place by adjusting the index of refraction of the ALD anode 3 on the scintillator needles 2. The remaining design of the x-ray detector remains the same.

Figure 6:
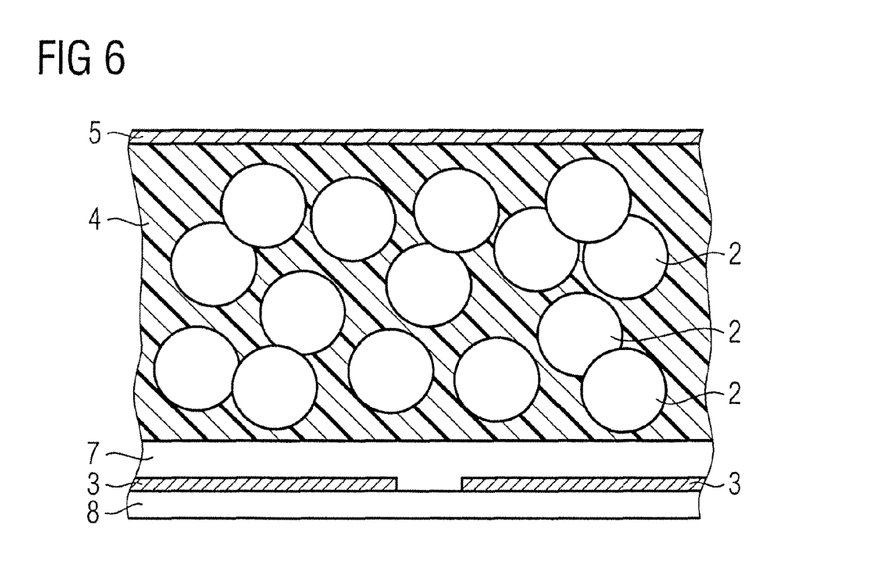
FIG. 6 shows an x-ray detector with pixelated anode.

FIG. 6 shows a hybrid photodiode with embedded scintillator particles 2 in the bulk heterojunction 4. This hybrid photoactive layer is arranged between the cathode 5 and a substrate 8 with a pixelated anode 3. Another interposed layer 7 can be located between the pixelated anode 3 and the hybrid photoactive layer. In general, interposed layers 7 (known as interlayers 7) can be used to assist or promote the charge transport to the electrodes 3, 5. The substrate 8 is in this case an active matrix backplane via which the pixel anodes 3 can be activated and read out. Just as for needle-shaped scintillators 2, the conversion of x-ray radiation X into fluorescence radiation takes place in the scintillators 2. The fluorescence radiation is absorbed in the bulk heterojunction 4 and transduced into electrical energy. The electron-hole pairs that are generated by the absorption of the fluorescence radiation are divided between anode 3 and cathode 5 in the applied field (as is also shown in FIG. 1) and detected. In the case of the scintillator particles 2, an isotropic emission of the fluorescence radiation into the bulk heterojunction 4 takes place. This produces an efficient transduction of the x-ray energy into electrical signals. The layer thickness of the hybrid photoactive layer with the bulk heterojunction 4 and the embedded scintillators 2 amounts to approximately 100 μm, but can also amount to just 10 μm depending on the field of application. For example, very thin layer thicknesses of the hybrid photoactive layer of approximately 1 μm are also possible. The structuring of the electrodes 3, 5 establishes the active area of the hybrid photodiodes. The pixelation of the electrodes 3, 5, depending on whether they are on the substrate 1, 8 or on the bulk heterojunction 4, can take place by shadow masks or lithographically. The structuring via shadow masks is advantageous given a direct vaporization process of the top electrode. Given an ALD-deposited oxide, for example, a lithographic structuring on the substrate 1 is possible. The pixel pitch thereby advantageously amounts to 50 μm. The active diode surface is chosen to be very large, especially for dose rate measurements, and can be up to 10 cm$^2$.

Figure 7:
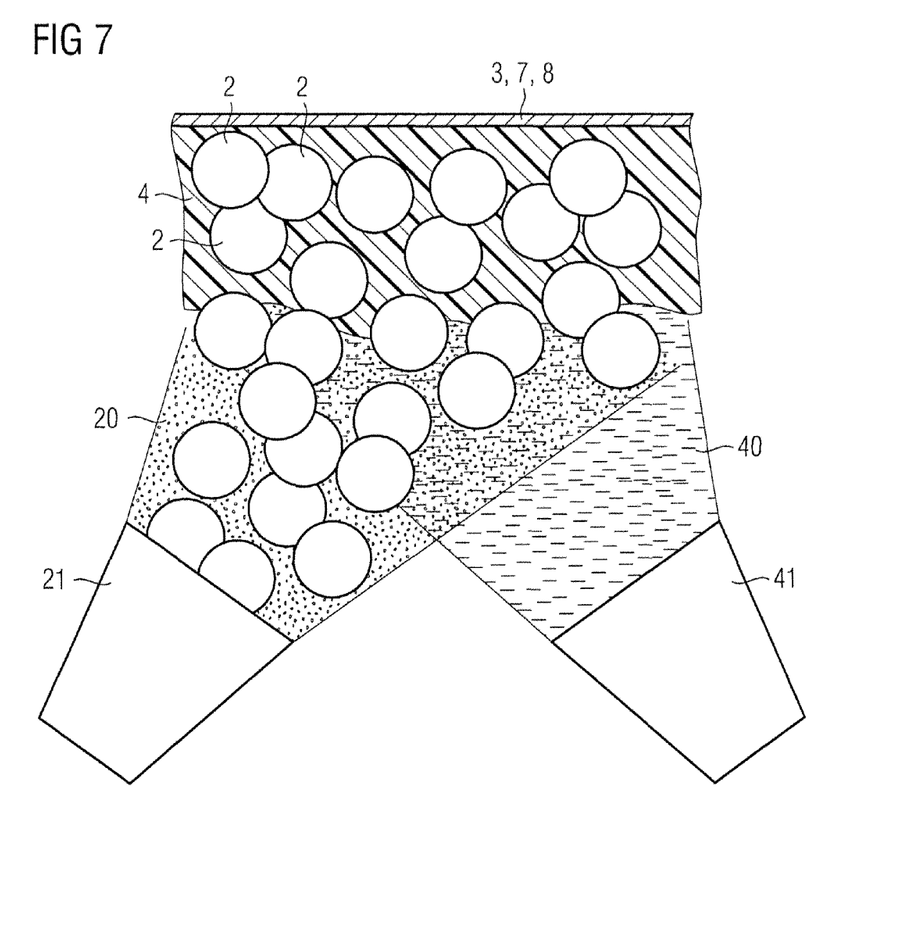
FIG. 7 shows a schematic representation of the manufacturing process of an x-ray detector with two spraying heads.

FIG. 7 now schematically shows the manufacturing process of the hybrid photodetector with particulate scintillators 2. The hybrid photoactive layer is applied in a co-spraying process onto a substrate 3, 7, 8. This means that the bulk heterojunction (BHJ) 4 is sprayed from a solution 40 simultaneously with a suspension 20 that comprises the scintillator particles 2. For this two spraying heads 21, 41 that are aligned towards the same substrate 3, 7, 8 are shown in FIG. 7. The scintillator proportion in the hybrid photoactive layer can thus be adjusted via the spraying duration and the composition of the scintillator suspension 20 and the BHJ solution 40. Moreover, the layer thickness of the hybrid photoactive layer can be specifically adjusted. The sprayed layer thicknesses amount to between 0.5 and 100 μm. Advantageous proportions of scintillator particles 2 in the bulk heterojunction 4 are between 10% by volume and 50% by volume. In contrast to deposition methods from the prior art in which particles are directly mixed with the organic semiconductor before their deposition, in this co-spraying method the scintillator is discreetly applied onto the substrate.

Figure 8:
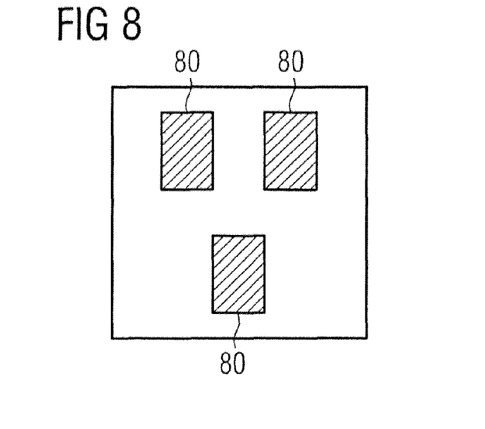
FIG. 8 shows a three-field sensor.
Figure 9:
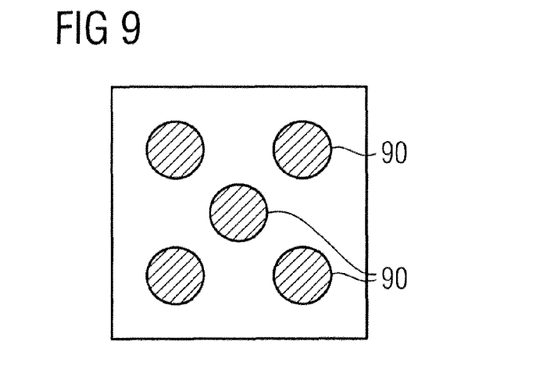
FIG. 9 shows a five-field sensor.
Figure 10:
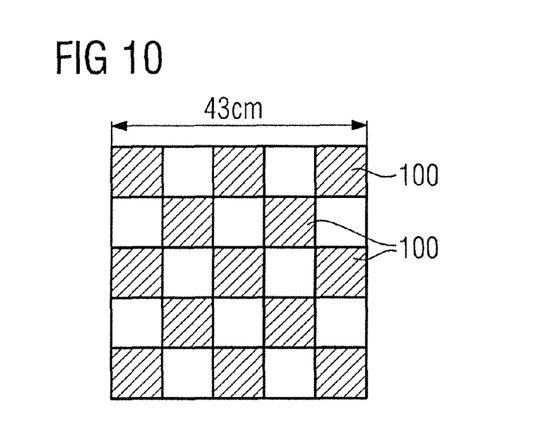
FIG. 10 shows a multi-field sensor.

FIGS. 8, 9 and 10 shows sensors with a dimension of 43×43 cm so as to be useable in existing x-ray apparatuses for dose rate measurement in what is known as the Automatic Exposure Control (AEC). Three-field or five-field sensors have typically been used for this, as is shown in FIGS. 8 and 9. The three-field arrangement as shown in FIG. 8 covers the lung and mediastinum region, as is important in medical applications of x-ray apparatuses. The hatched areas 80, 90 in FIGS. 8 and 9 represent the sensor surfaces. Shown in FIG. 10 is an arrangement of sensor surfaces 100 according to the invention as can be realized particularly well by the x-ray detectors with hybrid photoactive layer according to the invention. These can be deposited very thinly and over a large area. A type of checkerboard pattern—i.e. an arrangement of the sensors 100 in a two-dimensional 5×5 matrix—can thus take place. Different subjects to be examined can be reacted to very flexibly with such a sensor with multiple (13, for example) sensor fields 100. Different combinations of the sensor fields 100 can be actively switched and used. The sensor fields 100 for dose rate measurement may not cast any shadows onto the x-ray image.

Figure 11:
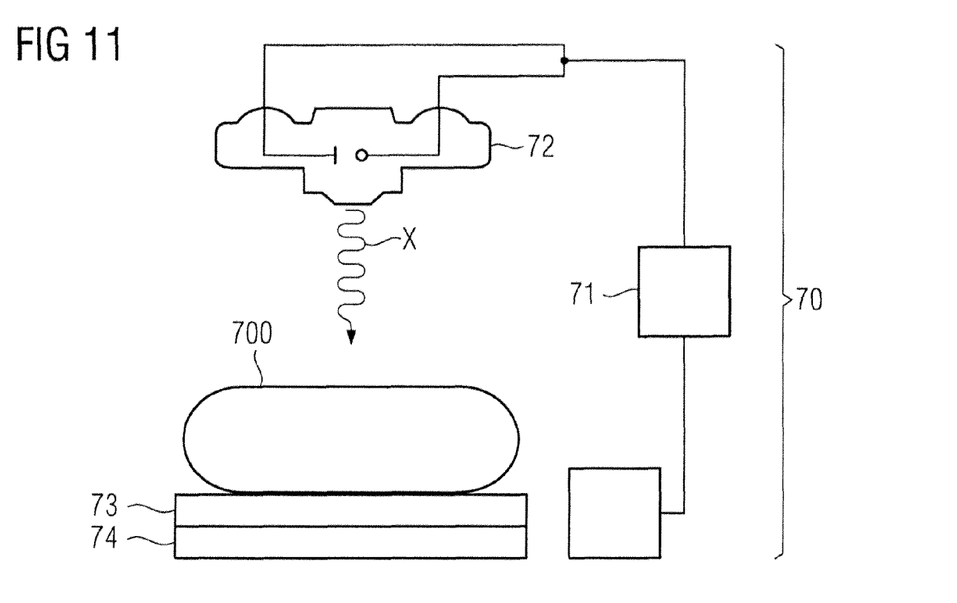
FIG. 11 shows an x-ray apparatus with x-ray detectors for imaging and dose monitoring.

FIG. 11 shows an x-ray apparatus 70 as it is used to examine an examination subject 700, for example in medicine. For this the examination subject 700 is placed above the x-ray detector unit 73, 74. This comprises an x-ray detector 73 for dose rate measurement and an x-ray detector 74 for imaging. Alternatively, an x-ray detector for dose rate measurement can also be mounted above the examination subject 700. The x-ray tube 72 in which the x-ray radiation X is generated is arranged so that the x-ray radiation X penetrates the examination subject 700 and subsequently strikes the x-ray detector unit 73, 74. Furthermore, an activation 71 of the x-ray tube 72 is shown.

This image of an x-ray apparatus shows that two x-ray detectors 73, 74 with very different requirements for x-ray measurement are necessary. It has therefore previously been necessary to resort to very different technologies for x-ray imaging (for example via indirect converters) and for x-ray dose rate measurement (ionization chambers, for example). With the hybrid x-ray detector according to the invention an x-ray detector can be manufactured for dose rate measurement just as much as for imaging. In particular, for dose rate measurement a low module depth is advantageous in order to absorb as little x-ray radiation as possible since this should still strike the second x-ray detector 74 for the imaging. The efficient transduction of the energy of the x-ray radiation X into signal charges is thus of particular importance for the dose rate measurement. However, the greatest possible amount of radiation should be absorbed for the x-ray imaging. There is always a trade-off between absorption and actual performance. This means that the quantum efficiency and the dynamic response of the x-ray diode are degraded with increasing layer thickness. The absorption of the x-ray radiation X in the hybrid photoactive layer increases exponentially with the layer thickness. The absorption should be low for Automatic Exposure Control applications. Layer thicknesses between 5 and 20 μm and a scintillator proportion of 50% by volume are advantageous for this. For x-ray imaging, layer thicknesses between 100 μm and 1 mm are advantageously used. Scintillator needles 2 with an ALD layer coating 3 via which the scintillator needles 2 act as optical waveguides are advantageous for imaging.

Figure 12:
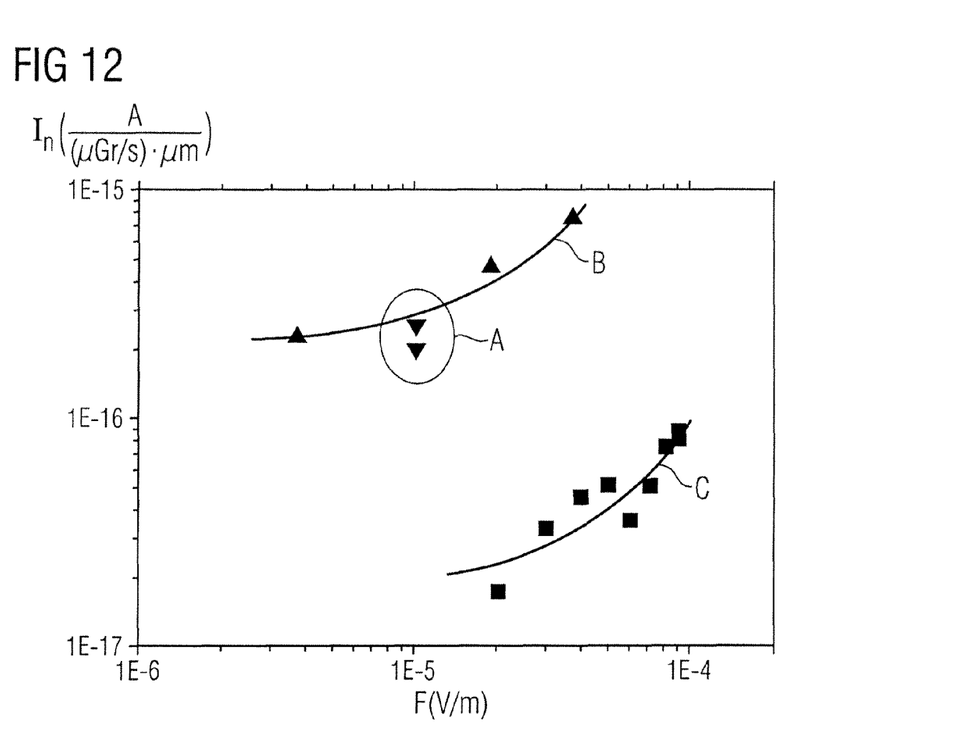
FIG. 12 shows a measurement diagram with current responses of different x-ray detectors.

FIG. 12 shows a diagram in which the efficiency of the transduction of the different x-ray detectors is presented. The measurement results A and C are respectively to be associated with an x-ray detector on the basis of indirect conversion; the measurement results B are to be associated with an x-ray detector based on direct conversion. The measured current $I_n$ (which was normalized to the dose rate and to the layer thickness of the respective x-ray detector) is indicated as a measure of the efficiency of the transduction of x-ray radiation X into a signal charge. The dose rate is in micrograys per second (μGr/s) and the layer thickness in micrometers. This value is plotted against the applied field (V/m), i.e. the applied voltage per layer thickness. An organic x-ray detector based on a bulk heterojunction with embedded lead-selenium quantum dots was used as an x-ray detector based on direct conversion. Its measurement results are labeled with B in the diagram. The quantum dots make up 50% by volume of the conversion layer. The embedding of quantum dots into an organic semiconductor material is based on direct x-ray conversion in said quantum dots, wherein the organic semiconductor material is responsible for conducting the generated electrical charge away. The measurement points designated with A are to be associated with a two-part x-ray detector according to the prior art as shown in FIG. 2. Organic photodiodes and a cesium iodide scintillator layer of 1 mm thickness have thereby been used as a photodetector. The measurement designated with C is to be associated with a hybrid x-ray detector according to the invention, with a hybrid photoactive layer made up of a bulk heterojunction 4 and embedded scintillator particles 2 made from gadolinium sulfur oxide. These were deposited according to the co-spraying method according to the invention. The hybrid photoactive layer is 10 μm. The gadolinium sulfur oxide particles make up 50% by volume of the active layer. The transduction efficiency can be tuned via the layer thickness. The evaluation of the different x-ray detectors takes place given a known dose rate (μG/s).

A difference between the embedded quantum dots and the scintillator particles 2 lies in the size of the particles. The scintillator particles 2 are between 1 μm and 4 μm in diameter. The quantum dots are between 3 nm and 6 nm in diameter. The conversion principle therefore differs. In the quantum dots the x-ray radiation is directly converted into electrical charge and the organic semiconductor material serves as a substrate for the quantum dots and as a conductive material to transport the charge away. In the scintillator particles the x-ray radiation is converted into scintillator radiation that in particular lies in the visible light range and is transduced into charge by an organic photoactive material.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray detector for imaging and/or dose rate measurement comprising:
   a first electrode;
   a substrate;
   a hybrid photoactive layer between said first electrode and said substrate, the hybrid photoactive layer comprising a plurality of scintillators and a bulk heterojunction and producing indirect x-ray conversion by said bulk heterojunction absorbing light in a wavelength range of the scintillator radiation of the scintillators to form electron-hole pairs that are electrically detected; and
   ALD (Atomic Layer Deposition) layer between the scintillators and the bulk heterojunction, said ALD layer forming both a second electrode and a moisture barrier.

2. An x-ray detector according to claim 1, wherein the bulk heterojunction comprises organic semiconductor materials that are soluble and can be deposited via a spraying process.

3. An x-ray detector according to claim 1, wherein the scintillators made up of a volume percentile between 10% by volume and 70% by volume of the hybrid photoactive layer.

4. An x-ray detector according to claim 1, wherein the hybrid photoactive layer has a homogeneous layer thickness and this is between 0.5 μm and 500 μm.

5. An x-ray detector according to claim 1, comprising an ALD layer, said ALD layer being at least partially permeable to electromagnetic radiation in a wavelength range of x-ray radiation that is to be detected or to light in said wavelength range of the scintillator radiation of the scintillators.

6. An x-ray detector as claimed in claim 1 wherein said plurality of scintillators are formed as needles with a needle profile, and wherein said ALD layer conforms to said needle profile.

7. An x-ray apparatus comprising:
   an x-ray source that emits x-ray radiation;
   a sensor that detects said x-ray radiation emitted by said x-ray source, said sensor being selected from the group of 3-field sensors and 5-field sensors; and
   said sensor comprising an x-ray detector comprising a first electrode, a substrate, a hybrid photoactive layer between said first electrode and said substrate, the hybrid photoactive layer comprising a plurality of scintillators and a bulk heterojunction and producing indirect x-ray conversion by said bulk heterojunction absorbing light in a wavelength range of the scintillator radiation of the scintillators to form electron-hole pairs that are electrically detected, and ALD (Atomic Layer Deposition) layer between the scintillators and the bulk heterojunction, said ALD layer forming both a second electrode and a moisture barrier.

8. An x-ray apparatus as claimed in claim 7 wherein said sensor has a size of 43×43 cm$^2$ for standardized automatic exposure control units.

9. An apparatus as claimed in claim 7 wherein said plurality of scintillators are formed as needles with a needle profile, and wherein said ALD layer conforms to said needle profile.

10. An x-ray apparatus comprising:
    an x-ray source that emits x-ray radiation;
    a sensor that detects x-radiation emitted by said x-ray source, said sensor comprising a plurality of x-ray detectors mounted in a two-dimensional matrix arrangement; and
    each of said x-ray detectors comprising a first electrode, a substrate, a hybrid photoactive layer between said first electrode and said substrate, the hybrid photoactive layer comprising a plurality of scintillators and a bulk heterojunction and producing indirect x-ray conversion by said bulk heterojunction absorbing light in a wavelength range of the scintillator radiation of the scintillators to form electron-hole pairs that are electrically detected, and ALD (Atomic Layer Deposition) layer between the scintillators and the bulk heterojunction, said ALD layer forming both a second electrode and a moisture barrier.

11. An x-ray apparatus as claimed in claim 10 wherein said sensor has a size of 43×43 cm$^2$ for standardized automatic exposure control units.

12. An apparatus as claimed in claim 10 wherein said plurality of scintillators are formed as needles with a needle profile, and wherein said ALD layer conforms to said needle profile.

* * * * *